United States Patent
Li

(10) Patent No.: US 11,057,583 B2
(45) Date of Patent: Jul. 6, 2021

(54) BULLET COMMENT PROCESSING METHOD AND APPARATUS, AND STORAGE MEDIUM

(71) Applicant: TENCENT TECHNOLOGY (SHENZHEN) COMPANY LIMITED, Shenzhen (CN)

(72) Inventor: Lun Li, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 69 days.

(21) Appl. No.: 16/570,808

(22) Filed: Sep. 13, 2019

(65) Prior Publication Data
US 2020/0014876 A1  Jan. 9, 2020

Related U.S. Application Data

(63) Continuation of application No. PCT/CN2018/093700, filed on Jun. 29, 2018.

(30) Foreign Application Priority Data

Jul. 7, 2017 (CN) .......................... 201710548924.9

(51) Int. Cl.
  *H04N 5/445* (2011.01)
  *H04N 21/4788* (2011.01)
  *H04N 21/488* (2011.01)

(52) U.S. Cl.
  CPC ..... *H04N 5/44504* (2013.01); *H04N 21/4788* (2013.01); *H04N 21/4884* (2013.01)

(58) Field of Classification Search
  CPC ........... H04N 21/4788; H04N 21/4884; H04N 5/44504
  See application file for complete search history.

(56) References Cited

U.S. PATENT DOCUMENTS

| 2013/0044050 A1* | 2/2013 | Ylivainio ............ G06F 40/169 345/156 |
| 2014/0013200 A1* | 1/2014 | White ............... H04N 21/4788 715/230 |

(Continued)

FOREIGN PATENT DOCUMENTS

| CN | 105828164 A | 8/2016 |
| CN | 105872709 A | 8/2016 |

(Continued)

OTHER PUBLICATIONS

The World Intellectual Property Organization (WIPO) International Search Report for PCT/CN2018/093700 dated Sep. 27, 2018 6 Pages (including translation).

*Primary Examiner* — Randy A Flynn
(74) *Attorney, Agent, or Firm* — Anova Law Group, PLLC

(57) ABSTRACT

A bullet comment processing method and apparatus, a server, and a storage medium are provided. When a bullet comment needs to be released, at least one candidate track matching a to-be-released bullet comment format is identified; then, a display duration of an existing bullet comment content in each candidate track is determined as a first duration corresponding to the each candidate track, and a display duration of a to-be-released bullet comment content when being placed in the each candidate track is determined as a second duration corresponding to the each candidate track; the second duration and the first duration of the each candidate track are compared, and a target track is identified to display the to-be-released bullet comment, where the second duration of the target track is greater than the first duration; and the to-be-released bullet comment content is displayed at the target track.

19 Claims, 6 Drawing Sheets

(56) References Cited

U.S. PATENT DOCUMENTS

| | | | |
|---|---|---|---|
| 2014/0215512 A1* | 7/2014 | Maruyama | H04N 21/44008 |
| | | | 725/34 |
| 2015/0286365 A1 | 10/2015 | Mizukami et al. | |
| 2016/0366466 A1* | 12/2016 | Shen | H04N 21/431 |
| 2017/0251240 A1* | 8/2017 | Peng | H04N 21/8153 |
| 2017/0272800 A1* | 9/2017 | Wang | H04N 21/4888 |
| 2018/0191987 A1* | 7/2018 | Cao | H04N 21/84 |

FOREIGN PATENT DOCUMENTS

| | | |
|---|---|---|
| CN | 106162298 A | 11/2016 |
| CN | 106792086 A | 5/2017 |
| CN | 107360459 A | 11/2017 |
| WO | 2014061715 A1 | 4/2014 |

* cited by examiner

BULLET COMMENT PROCESSING METHOD AND APPARATUS, AND STORAGE MEDIUM

CROSS-REFERENCES TO RELATED APPLICATIONS

This application is a continuation application of PCT Patent Application No. PCT/CN2018/093700, filed on Jun. 29, 2018, which claim priority to Chinese Patent Application No. 201710548924.9, entitled "BULLET COMMENT PROCESSING METHOD AND APPARATUS AND STORAGE MEDIUM" filed with the China National Intellectual Property Administration on Jul. 7, 2017, the entire contents of all of which are incorporated herein by reference.

FIELD OF TECHNOLOGY

Embodiments of this application relate to the field of communication technologies, and in particular, to a bullet comment processing method and apparatus, a server, and a storage medium.

BACKGROUND OF THE DISCLOSURE

In current video playing, a bullet comment is a relatively common function, which has positive effects in enhancing interaction between viewers and improving product activity. The so-called bullet comment refers to a manner of displaying comments from users. Since an effect caused when a large amount of complaints and comments float across a screen looks like bullet comments in a flying and shooting game, the effect of appearance of a large amount of complaints and comments is called a bullet comment. The bullet comment may provide viewers with an illusion of "real-time interaction". Although different bullet comments are sent at different moments, a bullet comment only appears at a specific time point in a video, and therefore, bullet comments sent at the same moment basically have the same subject, and a viewer, when giving comments, will have an illusion that he/she gives the comments at the same time with other viewers. In a related technology, a bullet comment is usually rendered and displayed with a video content. Furthermore, to achieve of large and comprehensive effects of bullet comments, it is usually necessary to calculate bullet comment tracks in real-time and refresh bullet comment positions regularly.

During a research and implementation process of the related technology, the inventor of the embodiments of this application discovers that, the current track algorithm may possibly cause a situation that bullet comments are superposed, and furthermore, since the current bullet comment track algorithm is relatively complicated and real-time calculation needs to consume more computing resources, rendering of a video may be influenced, occurrence of situations such as sticking and reduction of Frames Per Second (FPS) may be caused, and video playing effects are influenced.

SUMMARY

Embodiments of this application provide a bullet comment processing method and apparatus, a server, and a storage medium, not only to avoid bullet comment superposition, but also to reduce consumption of computing resources, reduce impact on rendering of a video content, and improve video playing effects.

An embodiment of this application provides a bullet comment processing method, including: obtaining, by a server, to-be-released bullet comment information. The to-be-released bullet comment information includes a to-be-released bullet comment content and a to-be-released bullet comment format. The method also includes: identifying, by the server, at least one candidate track matching the to-be-released bullet comment format; determining, by the server, a display duration of an existing bullet comment content in each candidate track as a first duration corresponding to the each candidate track; and determining, by the server, a display duration of the to-be-released bullet comment content when being placed in the each candidate track as a second duration corresponding to the each candidate track. The method also includes: comparing, by the server, the second duration and the first duration of the each candidate track; and identifying, by the server among the at least one candidate track, a target track for displaying the to-be-released bullet comment content. The second duration of the target track is greater than the first duration of the target track. And the method further includes: displaying the to-be-released bullet comment content at the target track.

Correspondingly, an embodiment of this application further provides a bullet comment processing apparatus, applied to a server, including: a memory and a processor coupled to the memory. The processor is configured to: obtain to-be-released bullet comment information. The to-be-released bullet comment information includes a to-be-released bullet comment content and a to-be-released bullet comment format. The processor is also configured to: identify at least one candidate track matching the to-be-released bullet comment format; determine a display duration of an existing bullet comment content in each candidate track as a first duration corresponding to the each candidate track; and determine, a display duration of the to-be-released bullet comment content when being placed in the each candidate track as a second duration corresponding to the each candidate track. The processor is also configured to: compare the second duration and the first duration of the each candidate track; and identify, among the at least one candidate track, a target track for displaying the to-be-released bullet comment content. The second duration of the target track is greater than the first duration of the target track. The processor is further configured to: displaying the to-be-released bullet comment content at the target track.

Furthermore, an embodiment of this application further provides a non-transitory computer readable storage medium, storing a plurality of instructions. The instructions, when being executed by a processor, can cause the processor to perform: obtaining to-be-released bullet comment information. The to-be-released bullet comment information includes a to-be-released bullet comment content and a to-be-released bullet comment format. The instructions also cause the processor to perform: identifying at least one candidate track matching the to-be-released bullet comment format; determining a display duration of an existing bullet comment content in each candidate track as a first duration corresponding to the each candidate track; and determining, a display duration of the to-be-released bullet comment content when being placed in the each candidate track as a second duration corresponding to the each candidate track. The instructions also cause the processor to perform: comparing the second duration and the first duration of the each candidate track; and identifying, among the at least one candidate track, a target track for displaying the to-be-released bullet comment content. The second duration of the target track is greater than the first duration of the target track. The instructions further cause the processor to perform: displaying the to-be-released bullet comment content at the target track.

In some embodiments of this application, when a bullet comment needs to be released, at least one bullet comment track matching a to-be-released bullet comment format is used as a candidate track. Then, a display duration (that is, a first duration) of a bullet comment content that is being displayed in each candidate track is determined, and a display duration (that is, a second duration) of a to-be-released bullet comment content when being placed in each candidate track is determined, and a target track is selected from the candidate tracks by comparing the two display durations, to display the to-be-released bullet comment. In this solution, since the candidate track of which the second duration is greater than the first duration may be selected as the target track, when the to-be-released bullet comment is moved (or displayed) in the target track, it definitely cannot catch up with a latest bullet comment that is displayed in the target track, to avoid occurrence of bullet comment superposition. Furthermore, since in this solution, a suitable target track may be selected for the bullet comment for displaying only by calculating the display duration of the bullet comment, without calculating a track of the bullet comment in real time and regularly refreshing the position of the bullet comment, consumption of computing resources may be reduced significantly, to reduce impact on rendering of a video content and improve video playing effects.

BRIEF DESCRIPTION OF THE DRAWINGS

To describe the technical solutions in the embodiments of this application more clearly, the following briefly describes the accompanying drawings required for describing the embodiments. Apparently, the accompanying drawings in the following description show merely some embodiments of this application, and a person skilled in the art may still derive other drawings from these accompanying drawings without creative efforts.

DESCRIPTION OF EMBODIMENTS

Figure 1:
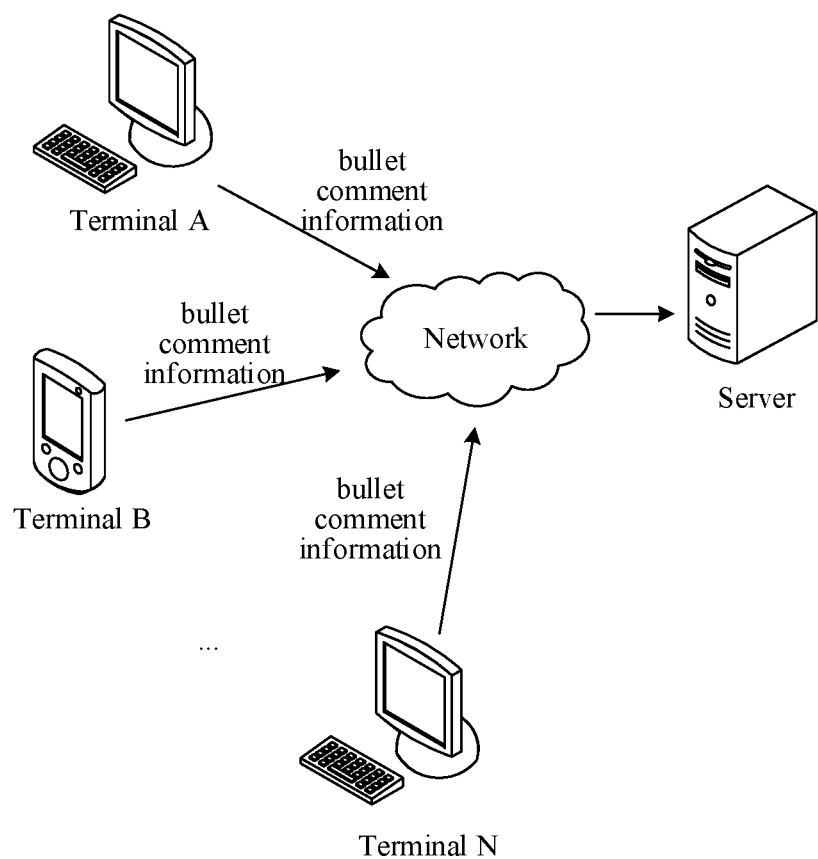
FIG. 1 is a schematic diagram of a scenario of a bullet comment processing method according to an embodiment of this application.

The following clearly and completely describes the technical solutions in the embodiments of this application with reference to the accompanying drawings in the embodiments of this application. Apparently, the described embodiments are only some of the embodiments of this application rather than all of the embodiments. All other embodiments obtained by a person skilled in the art based on the embodiments of this application without creative efforts shall fall within the protection scope of this application.

First, several terms involved by the embodiments of this application are introduced.

1. Bullet comment information: including information such as a bullet comment content and a bullet comment format. A bullet comment, also called bullet screen or bullet subtitle, as used herein, refer to a comment that is overlaid directly onto a currently presented multimedia (e.g., a video, a flash, an image, a comic page, etc.), synced to a specific playback time. This allows comments to respond directly to events occurring in the video, in sync with the viewer, which creates a sense of a shared watching experience.

The bullet comment content is a commentary content popped up when a multimedia resource is played, for example, the bullet comment content includes information such as text, character, avatar, icon, image, etc. The multimedia resource includes an audio resource and/or a video resource.

The bullet comment format is used to indicate a display mode of the bullet comment content, for example, the bullet comment format is used to indicate at least one of a font type, a font size, a color, a moving velocity, and a display position. The display position may include at least one of a top, a middle portion, or a bottom of a bullet comment display region.

2. To-be-released bullet comment information: bullet comment information that is not displayed in the bullet comment display region and is to be released, including information such as a to-be-released content and a to-be-released format.

3. Bullet comment track: a strip-shaped track used for displaying a bullet comment content when a multimedia resource is played.

Optionally, the bullet comment display region includes at least two bullet comment tracks. The target track is a track for displaying a to-be-released bullet comment content.

4. First duration (length of time or time span) corresponding to a candidate track: a display duration of a bullet comment content that is being displayed in the candidate track (e.g., the display duration of an existing bullet comment currently being displayed or have already scheduled to be displayed in the candidate track).

Optionally, the first duration corresponding to the candidate track is an estimated display duration of the bullet comment content that is being displayed in the candidate track, that is, an estimated display duration from a moment at which the bullet comment content that is being displayed is moved in the candidate track to a moment at which the bullet comment content that is being displayed is fully moved out of the candidate track.

Optionally, the bullet comment content that is being displayed is a latest bullet comment content in the candidate track.

5. Second duration corresponding to the candidate track: a display duration of a to-be-released bullet comment content in the candidate track.

Optionally, the second duration corresponding to the candidate track is an estimated display duration of the to-be-released bullet comment content in the candidate track, that is, an estimated display duration from a moment at which the to-be-released bullet comment content is moved in the candidate track to a moment at which the to-be-released bullet comment content is fully moved out of the candidate track.

An embodiment of this application provides a bullet comment processing method and apparatus, a server, and a storage medium.

The bullet comment processing apparatus may be integrated in the server. For example, the bullet comment processing apparatus is integrated in the server. Referring to FIG. 1, the server may receive bullet comment information sent by each terminal, such as a terminal A, a terminal B . . . and a terminal N, a plurality of bullet comment tracks is generated according to the bullet comment information, and bullet comment information that needs to be displayed at present is determined and used as to-be-released bullet comment information. Then, a plurality of bullet comment tracks matching a bullet comment format (referred to as a to-be-released bullet comment format in some embodiments of this application) indicated in the to-be-released bullet comment information is selected from the generated plurality of bullet comment tracks as the candidate tracks, and a candidate track that will not cause a bullet comment to be superposed with the to-be-released bullet comment is selected as a target track to display the to-be-released bullet comment content.

Optionally, the server is also referred to as a bullet comment information server. The server may be one server, a server cluster including a plurality of servers, a virtualization platform, or a cloud computation service center.

Optionally, the server includes a background server providing an online video service. Optionally, the server includes a background server providing an online video value-added service.

Optionally, a video client is run in the server, and the video client is used to play a target video and/or a bullet comment content of the target video.

The condition that a to-be-released bullet comment content in a certain bullet comment track will not be superposed with a latest bullet comment content displayed in a target track is that: a moment at which a bullet comment content that is being displayed in the bullet comment track is moved out of the bullet comment track is earlier than a moment at which the to-be-released bullet comment content is moved out of the bullet comment track. Therefore, a duration of a bullet comment content that is being displayed in each candidate track may be determined, to obtain a first duration corresponding to each candidate track, and a display duration of the to-be-released bullet comment content being located/placed in each candidate track is determined, to obtain a second duration corresponding to each candidate track. Then, the candidate track of which the second duration is greater than the first duration is used as a target track, to display the to-be-released bullet comment content.

This application will be described with examples below respectively. It should be noted that, the serial numbers of the following embodiments do not limit a sequence of the embodiments.

In some embodiments, description will be made from the perspective of a bullet comment processing apparatus. The bullet comment processing apparatus may be integrated in a device such as a server.

The bullet comment processing method includes: obtaining, by a server, to-be-released bullet comment information, the to-be-released bullet comment information including a to-be-released bullet comment content and a to-be-released bullet comment format; using at least one bullet comment track matching the to-be-released bullet comment format as a candidate track; determining, by the server, a display duration of a bullet comment content that is being displayed in each candidate track, to obtain a first duration corresponding to the each candidate track; determining, by the server, a display duration of the to-be-released bullet comment content being located in the each candidate track, to obtain a second duration corresponding to the each candidate track; and comparing, by the server, the second duration and the first duration of the each candidate track, using the candidate track of which the second duration is greater than the first duration as a target track, and displaying the to-be-released bullet comment content in the target track.

Figure 2:
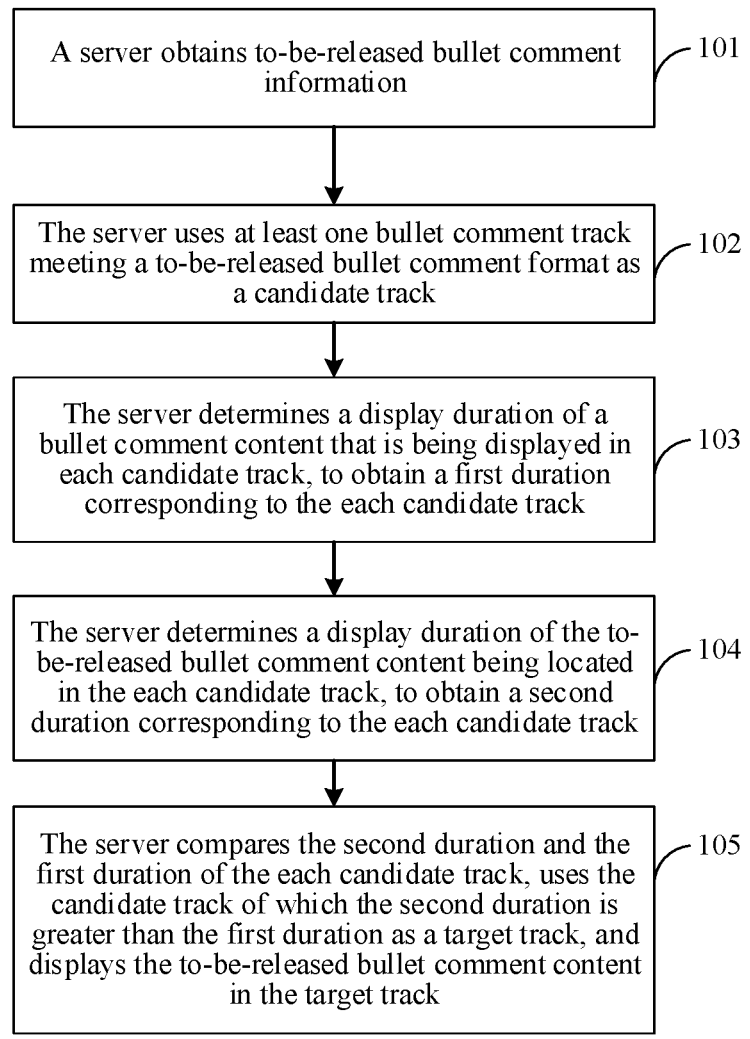
FIG. 2 is a flowchart of a bullet comment processing method according to an embodiment of this application.

As shown in FIG. 2, the bullet comment processing method has the following procedures.

101: The server obtains to-be-released bullet comment information.

For example, the server may be configured to determine, from a plurality of pieces of bullet comment information received, the bullet comment information that needs to be displayed at present, to obtain the to-be-released bullet comment information.

Optionally, the server may be configured to determine, from m pieces of bullet comment information received, the bullet comment information that needs to be displayed at present, to obtain the to-be-released bullet comment information, where m is a positive integer greater than 1.

For example, the server may receive a plurality of pieces of bullet comment information sent by a certain terminal, receive a plurality of pieces of bullet comment information sent by a plurality of terminals, or the like, and then, determine the bullet comment information that needs to be displayed at present, to obtain the to-be-released bullet comment information.

The to-be-released bullet comment information may include a to-be-released bullet comment content, a to-be-released bullet comment format, and other information. The to-be-released bullet comment content refers to a content that needs to be displayed on the bullet comment, for example, information such as text and/or character. The to-be-released bullet comment format refers to a display mode of the bullet comment content, for example, at least one of a font type, a font size (that is, word size), a color, a moving velocity, and a display position. The display position may include a top (that is, a top of the bullet comment display region), a middle portion (a middle portion of the bullet comment display region), a bottom (that is, a bottom of the bullet comment display region), and so on.

102. The server uses at least one bullet comment track matching the to-be-released bullet comment format as a candidate track. In other words, the server identifies at least one candidate track suitable for displaying the to-be-released bullet comment content. The at least one candidate track is compatible with the to-be-released bullet comment format.

Optionally, the server uses k bullet comment tracks matching the to-be-released bullet comment format as k candidate tracks, where k is a positive integer.

For example, if it is indicated in the to-be-released bullet comment format that the font type of the bullet comment is regular script, the font color is red, the font size is No. 4, and the display position is a top, a bullet comment track that is located at a top and can accommodate regular script in font size No. 4 may be selected as a candidate track.

Furthermore, for example, if it is indicated in the to-be-released bullet comment format that the font type of the bullet comment is Song style, the font color is black, the font size is No. 6, and the display position is a middle portion, a bullet comment track that is located in a middle portion and can accommodate Song style in font size No. 6 may be selected as a candidate track. The rest can be done in the same manner.

The bullet comment track may be generated according to the received bullet comment information, that is, before the step "obtaining the to-be-released bullet comment information", the bullet comment processing method may further include the following step:

The server receives the plurality of pieces of bullet comment information and generates the plurality of bullet comment tracks according to the plurality of pieces of bullet comment information.

Optionally, the server receives the m pieces of bullet comment information and generates m bullet comment tracks according to the m pieces of bullet comment information.

The bullet comment tracks may be generated through many manners. For example, a plurality of initial tracks may be generated according to a bullet comment format of each piece of bullet comment information and then, repeated initial tracks are removed, to obtain a plurality of bullet comment tracks. Furthermore, for example, the bullet comment information is classified, and then, a corresponding bullet comment track is generated for each type of bullet comment information.

To facilitate description, in some embodiments of this application, an example that the bullet comment information is classified and a corresponding bullet comment track is generated for each type of bullet comment information is taken for description. That is, the step "generating the plurality of bullet comment tracks according to the plurality of pieces of bullet comment information" includes, but is not limited to, the following steps:

(1) Classify the plurality of pieces of bullet comment information received according to the bullet comment formats of the plurality of pieces of bullet comment information received. In other words, each of the plurality of pieces of bullet comment information is classified into a corresponding type, according to bullet comment formats of the plurality of pieces of bullet comment information.

A classification standard may be determined according to requirements for an actual application. For example, a font size in a bullet comment format may be taken as the classification standard, a combination of a font size and a display position may be taken as the classification standard, or the like.

For example, the font size is taken as a classification standard. Bullet comment information in the same font size may be classified into one type. For example, bullet comment information in font size Nos. 6, 5, 4, 3 is classified into one type respectively. Alternatively, bullet comment information in a certain range of font sizes is classified into one type, for example, bullet comment information in font size Nos. 6 and 5 is classified into one type, and bullet comment information in font size Nos. 4 and 3 is classified into another type. The rest can be done in the same manner.

(2) Respectively determine a maximum height of a bullet comment content in each type of the bullet comment information. In other words, a maximum height of each type of bullet comment information is determined.

A maximum height of a bullet comment content has a positive association with a maximum height of a font, that is, if a maximum height of a font is greater, a maximum height of a bullet comment content is greater. Optionally, a maximum height of a bullet comment content is a maximum height of a font or is a value that has a preset functional relationship with the maximum height of the font.

The maximum height of the bullet comment content may be the maximum height of the font. For example, an example that bullet comment information in font size Nos. 6, 5, 4, 3 is classified into one type respectively and a size of a font is equal to a height of the font is taken for description. At this time, the heights of font size Nos. 6, 5, 4, and 3 are respectively used as maximum heights of bullet comment contents in corresponding types of bullet comment information. Furthermore, for example, if bullet comment information in font size Nos. 6 and 5 is classified into one type and bullet comment information in font size Nos. 4 and 3 is classified into one type, since a height of font size No. 5 is greater than a height of font size No. 6, the height of font size No. 5 may be used as the maximum height of the bullet comment content in the bullet comment information in the corresponding type "font size Nos. 6 and 5", and similarly, since a height of font size No. 3 is greater than font size No. 4, the height of font size No. 3 may be used as the maximum height of the bullet comment content in the bullet comment information in the corresponding type "font size Nos. 4 and 3". The rest can be done in the same manner.

Besides, the maximum height of the bullet comment content may also be a value that has a preset functional relationship with the maximum height of the font. The value is greater than the maximum height of the font. The functional relationship may also be set according to requirements for an actual application. For example, the maximum height of the bullet comment content may be set as the maximum height of the font plus 0.2 mm. Details are not further described herein.

(3) Respectively generate a bullet comment track corresponding to each type of bullet comment information in the bullet comment display region by using the maximum height (that is, the maximum height of the bullet comment content in each type of bullet comment information) as a reference value. In other words, a bullet comment track in the bullet comment display region is generated by using the maximum height of the type of bullet comment information that the bullet comment track belongs to as a reference value.

Optionally, the server classifies m pieces of bullet comment information received according to bullet comment formats of the m pieces of bullet comment information received, to obtain n types of bullet comment information; maximum heights of bullet comment contents respectively corresponding to the n types of bullet comment information are determined, n being a positive integer; for each type of bullet comment information in the n types of bullet comment information, a bullet comment track corresponding to the type of bullet comment information is generated in the bullet comment display region by using the maximum height of the bullet comment content corresponding to the type of bullet comment information as the reference value.

For example, if, in point (2), it is determined that the maximum height of the bullet comment content in a certain type of bullet comment information is 0.6 cm, a bullet comment track corresponding to the type of bullet comment information may be generated in the bullet comment display region by taking 0.6 cm as the reference value. For example, a bullet comment track having a track height being 0.6 cm is generated or a bullet comment track having a track height being 0.7 cm is generated.

The functional relationship between the track height of the bullet comment back and the maximum height (that is, the maximum height of the bullet comment content in each type of bullet comment information) may be set according to requirements for an actual application. Details are not further described herein.

Since the plurality of bullet comment tracks generated may have different track heights, cavities may possibly exist between bullet comment tracks, resulting in waste of a screen space. Therefore, to avoid the problem about cavities between bullet comment tracks caused by inconsistent track heights, optionally, when the bullet comment tracks are generated, the generated bullet comment tracks are concentrated as far as possible, for example, are close to a hot spot region in the bullet comment display region as far as possible. That is, optionally, before the step "respectively generate a bullet comment track corresponding to each type of bullet comment information in the bullet comment display region by using the maximum height as a reference value", the bullet comment processing method may further include the following step:

Determine the hot spot region in the bullet comment display region. The hot spot region is a region in which a bullet comment display frequency is greater than a preset threshold. The preset threshold may be set according to requirements for an actual application. A quantity of the hot spot regions may be one or more than one. To facilitate description, in some embodiments of this application, an example that the quantity of the hot spot regions is one is taken for description, that is, in some embodiments of this application, an example that the hot spot region is a region having a highest display frequency is taken for description.

At this time, the step "respectively generate a bullet comment track corresponding to each type of bullet comment information in the bullet comment display region by using the maximum height as a reference value" includes, but is not limited to, the following steps:

Determine a height of the bullet comment track corresponding to each type of the bullet comment information according to the maximum height and determine a total quantity of the bullet comment tracks that need to be generated; then, respectively determine a position of each bullet comment track that needs to be generated in the bullet comment display region according to the heights of the bullet comment tracks, the total quantity of the bullet comment tracks, and the hot spot region determined; and respectively generate the corresponding bullet comment tracks at the positions determined.

Optionally, the server determines, for the $j^{th}$ type of bullet comment information in the n types of bullet comment information, a height of bullet comment track corresponding to the bullet comment information according to the maximum height and determine a total quantity of the bullet comment tracks that need to be generated; determines, for the $j^{th}$ type of bullet comment information in the n types of bullet comment information, positions of the bullet comment tracks that need to be generated in the bullet comment display region according to the heights of the bullet comment tracks, the total quantity of the bullet comment tracks, and the hot spot region determined, j being a positive integer less than or equal to n; and respectively generates the bullet comment tracks corresponding to the n types of bullet comment information at the positions determined.

The step "respectively determine positions of the bullet comment tracks that need to be generated in the bullet comment display region according to the heights of the bullet comment tracks, the total quantity of the bullet comment tracks, and the hot spot region determined" includes, but is not limited to, the following steps:

Determine an area that needs to be occupied by the bullet comment track that needs to be generated in the bullet comment display region according to the heights of the bullet comment tracks and the total quantity of the bullet comment tracks determined; obtain, in the bullet comment display region, a region having a size matching the area as a target region by using a center line of the hot spot region as a center line; and divide the target region according to the heights of the bullet comment tracks and the total quantity of the bullet comment tracks determined, to determine a position of the each bullet comment track that needs to be generated in the bullet comment display region.

Optionally, the server determines, for the $j^{th}$ type of bullet comment information in the n types of bullet comment information, an area that needs to be occupied by the bullet comment tracks that need to be generated in the bullet comment display region according to the heights of the bullet comment tracks and the total quantity of the bullet comment tracks determined; obtain, in the bullet comment display region, a region having a size matching the area as a target region by using a center line of the hot spot region as a center line; and divide the target region according to the heights of the bullet comment tracks and the total quantity of the bullet comment tracks determined, to determine positions of the bullet comment tracks that need to be generated in the bullet comment display region.

It should be noted that, if the plurality of bullet comment tracks is generated according to the plurality of pieces of bullet comment information received, at this time, step 101 (that is, obtaining to-be-released bullet comment information) may include: determining, from the plurality of pieces of bullet comment information received, bullet comment information that needs to be displayed at present, to obtain the to-be-released bullet comment information. The relevant description about step 101 may be referred to for relevant details. Details are not further described herein

103. The server determines a display duration of a bullet comment content that is being displayed in each candidate track, to obtain a first duration corresponding to the each candidate track. For example, the server determines that the first duration corresponding to a candidate track equals the display duration of an existing bullet comment content being displayed in such candidate track. In some embodiments, a candidate track may be assigned or used to display multiple existing bullet comment contents, and the first duration corresponding to the candidate track may equal a duration required to play all the existing bullet comment contents in this candidate track.

Optionally, the server determines display durations of bullet comment contents that are being displayed respectively corresponding to k candidate tracks, to obtain first durations respectively corresponding to the k candidate tracks.

A display duration of a bullet comment content that is being displayed in a candidate track (e.g., an existing bullet comment content being displayed in the candidate track) refers to a display duration from a moment at which the bullet comment content that is being displayed in the candidate track begins to be displayed in the candidate track to a moment at which display is ended. For example, if a display mode of the bullet comment content is a "flash" mode, the display duration refers to a duration from a moment at which the bullet comment content "appears" to a moment at which the bullet comment content "disappears". If the display mode of the bullet comment content is a "mobile" mode, the display duration is a duration from a moment at which the bullet comment content is moved in the bullet comment display region to a moment at which the bullet comment content is moved out of the bullet comment display region (referred to as, for short, a duration of the bullet comment content being moved out of the bullet comment display region). The rest can be done in the same manner. It should be noted that, to facilitate description, in some embodiments of this application, an example that the display mode of the bullet comment content is the "mobile" mode is taken for description, that is, the step "determine a display duration of a bullet comment content that is being displayed in each candidate track, to obtain a first duration corresponding to the each candidate track" includes, but is not limited to, the following steps:

(1) Determine a length of the bullet comment content that is being displayed in the each candidate track, a moving velocity of the bullet comment content, and a width of a bullet comment display region.

The length of the bullet comment content may be determined according to a quality of pieces of information such as text and/or characters in the bullet comment content and a font size. The moving velocity may be determined according to a bullet comment format or a track attribute. For example, if the moving velocity has been indicated in the bullet comment format, the indicated moving velocity is based on, if the moving velocity is not indicated in the bullet comment format, the moving velocity indicated in the track attribute is based on, and so on.

The bullet comment display region refers to a region that is located in a screen interface and used for displaying bullet comments. A width of the bullet comment display region refers to a distance between a position at which a certain character in the bullet comment content is moved in the bullet comment display region to a position at which the character is moved out of the bullet comment display region.

(2) Determine, according to the length of the bullet comment content that is being displayed, the moving velocity of the bullet comment content, and the width of a bullet comment display region, a duration of the bullet comment content that is being displayed in the each candidate track being moved out of the bullet comment display region, to obtain the first duration corresponding to the each candidate track.

Optionally, the server determines, for the $i^{th}$ candidate track in the k candidate tracks, a length of the bullet comment content that is being displayed in the candidate track, a moving velocity of the bullet comment content, and a width of the bullet comment display region, and determines, for the $i^{th}$ candidate track in the k candidate tracks, a duration of the bullet comment content that is being displayed in the candidate track being moved out of the bullet comment display region according to the length of the bullet comment content that is being displayed, the moving velocity of the bullet comment content, and the width of the bullet comment display region, to obtain the first duration corresponding to the candidate track, i being a positive integer less than or equal to k.

For example, if the velocity of the bullet comment content that is being displayed is uniform during a movement process, at this time, a sum of the length of the bullet comment content that is being displayed and the width of the bullet comment display region may be determined, to obtain a first value corresponding to each candidate track. Then, a quotient of the first value corresponding to each candidate track and the moving velocity of the bullet comment content that is being displayed in each candidate track is determined, to obtain a first duration corresponding to each candidate track. The formula is as follows:

$$t_1=(w_1+W)/v_1.$$

t1 represents a first duration, w1 represents a length of a bullet comment content, W represents a width of a bullet comment display region, and v1 represents a moving velocity of the bullet comment content that is being displayed in a candidate track.

104. The server determines a display duration of the to-be-released bullet comment content being located in the each candidate track, to obtain a second duration corresponding to the each candidate track. For example, the server determines that, if the to-be-released bullet content were to be placed in one candidate track, the second duration corresponding to this candidate track equals the display duration of the to-be-released bullet content in this candidate track.

Optionally, the server determines display durations of the to-be-released bullet comment content being located in the k candidate tracks, to obtain second durations respectively corresponding to the k candidate tracks.

Optionally, that the server determines a display duration of the to-be-released bullet comment content being located in the each candidate track, to obtain a second duration corresponding to the each candidate track includes, but is not limited to, the following two possible implementation modes.

In one possible implementation mode, the process of determining a second duration corresponding to a candidate track includes, but is not limited to, the following steps:

(1) Determine a length of the to-be-released bullet comment content, a width of a bullet comment display region, and a moving velocity of the to-be-released bullet comment content when the to-be-released bullet comment content is located in each candidate track.

The length of the to-be-released bullet comment content may be determined according to a quality of pieces of information such as text and/or characters in the to-be-released bullet comment content and a font size. The moving velocity may be determined according to a to-be-released bullet comment format or a track attribute. For example, if the moving velocity has been indicated in the to-be-released bullet comment format, the indicated moving velocity is based on, if the moving velocity is not indicated in the to-be-released bullet comment format, the moving velocity indicated in the track attribute is based on, and so on.

(2) Determine, according to the length of the to-be-released bullet comment content, the width of the bullet comment display region, and the moving velocity of the to-be-released bullet comment content when the to-be-released bullet comment content is located in the each candidate track, a duration of moving the to-be-released bullet comment content out of the bullet comment display region when the to-be-released bullet comment content is located in the each candidate track, to obtain the second duration corresponding to the each candidate track.

For example, if the velocity of the to-be-released bullet comment content is uniform during a movement process, at this time, a sum of the length of the to-be-released bullet comment content and the width of the bullet comment display region may be determined, to obtain a second value corresponding to each candidate track. Then, a quotient of the second value corresponding to each candidate track and the moving velocity of the to-be-released bullet comment content in each candidate track is determined, to obtain a second duration corresponding to each candidate track. The formula is as follows:

$$t_2=(w_2+W)/v_2.$$

t2 represents a second duration, w2 represents a length of a to-be-released bullet comment content, W represents a width of a bullet comment display region, and v2 represents a moving velocity of the to-be-released bullet comment content.

In another possible implementation mode, the process of determining the second duration corresponding to the candidate track includes, but is not limited to, the following steps:

(1) Determine a moving velocity of a to-be-released bullet comment content when the to-be-released bullet comment content is located in each candidate track and a width of a bullet comment display region.

For each candidate track, the server determines the moving velocity of the to-be-released bullet comment content when the to-be-released bullet comment content is located in the candidate track and the width of the bullet comment display region.

It should be noted that, the relevant details of the first possible implementation mode may be referred to for the process that the server determines the moving velocity of the to-be-released bullet comment content when the to-be-released bullet comment content is located in each candidate track and the width of the bullet comment display region. Details are not further described herein.

(2) Determine a quotient of the width of the bullet comment display region and the moving velocity of the to-be-released bullet comment content when the to-be-released bullet comment content is located in each the candidate track, to obtain a second duration corresponding to each the candidate track.

For each candidate track, the server determines a quotient of the width of the bullet comment display region and the moving velocity of the to-be-released bullet comment content when the to-be-released bullet comment content is located in the candidate track as the second duration corresponding to the candidate track.

For example, if the velocity of the to-be-released bullet comment content is uniform during a movement process, at this time, the second duration corresponding to the candidate track may be determined and obtained according to the following formula:

$$t_2 = W/v_2.$$

$t_2$ represents a second duration, W represents a width of the bullet comment display region, and $v_2$ represents a moving velocity of the to-be-released bullet comment content.

Steps 103 and 104 may be performed not in a sequence. To facilitate description, in some embodiments of this application, an example that step 103 is first performed and then step 104 is performed is taken description.

105: The server compares the second duration and the first duration of the each candidate track, uses the candidate track of which the second duration is greater than the first duration as a target track, and displays the to-be-released bullet comment content in the target track.

Optionally, for the $i^{th}$ candidate track in the k candidate tracks, the second duration of the candidate track is compared with the first duration of the candidate track, the candidate track of which the second duration is greater than the first duration is taken as a target track, the to-be-released bullet comment content is displayed in the target track, and i is a positive integer less than or equal to k.

For example, $t_1$ represents the first duration and $t_2$ represents the second duration, $t_2$ and $t_1$ of each track are compared, the candidate track matching a condition $t_2 \geq t_1$ is taken as a target track, and the to-be-released bullet comment content is displayed in the target track.

In view of the above, in some embodiments, when a bullet comment needs to be released, at least one bullet comment track matching a to-be-released bullet comment format is used as a candidate track. Then, a display duration (that is, a first duration) of a bullet comment content that is being displayed in each candidate track is determined, and a display duration (that is, a second duration) of a to-be-released bullet comment content being located in each candidate track is determined, and a target track is selected from the candidate tracks by comparing the two display durations, to display the to-be-released bullet comment. In this solution, since the candidate track of which the second duration is greater than the first duration may be selected as the target track, when the to-be-released bullet comment is moved (or displayed) in the target track, it definitely cannot catch up with a latest bullet comment that is displayed in the target track, to avoid occurrence of bullet comment superposition. Furthermore, since in this solution, a suitable target track may be selected for the bullet comment for displaying only by calculating the display duration of the bullet comment, without calculating a track of the bullet comment in real time and regularly refreshing the position of the bullet comment, consumption of computing resources may be reduced significantly, to reduce impact on rendering of a video content and improve video playing effects.

An example is taken for further description below.

In some embodiments, for example, the bullet comment processing apparatus is integrated in a server.

Figure 3:
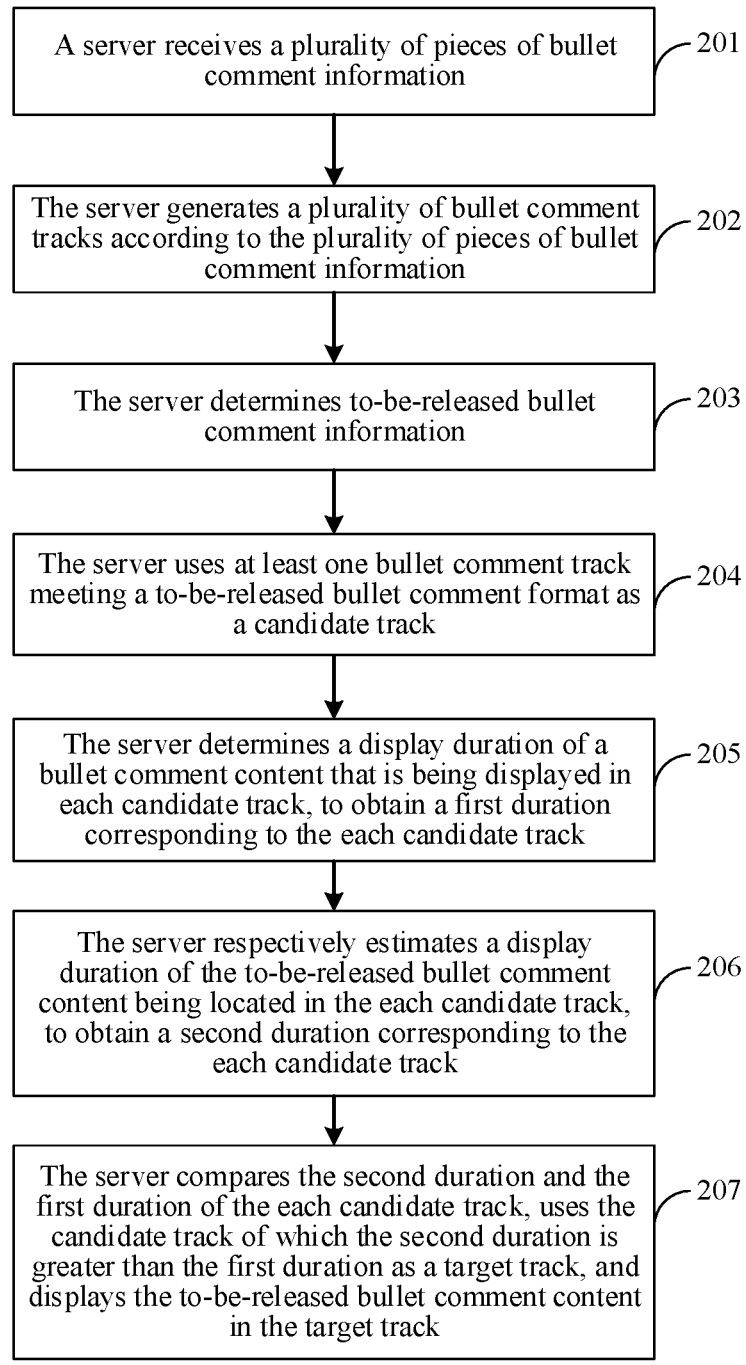
FIG. 3 is another flowchart of a bullet comment processing method according to an embodiment of this application.

As shown in FIG. 3, the bullet comment processing method has the following procedures.

201: The server receives a plurality of pieces of bullet comment information.

For example, the server may receive a plurality of pieces of bullet comment information sent by a certain terminal or receives a plurality of pieces of bullet comment information sent by a plurality of terminals, and so on.

202: The server generates a plurality of bullet comment tracks according to the plurality of pieces of bullet comment information, for example:

(1) The server classifies the plurality of pieces of bullet comment information received according to the bullet comment formats of the plurality of pieces of bullet comment information received.

A classification standard may be determined according to requirements for an actual application. For example, a font size in a bullet comment format may be taken as the classification standard, a combination of a font size and a display position may be taken as the classification standard, or the like.

For example, the bullet comment format includes a font type, a font size, and a font color, and the font size is taken as a classification standard. If the received bullet comment information includes bullet comment information 1, bullet comment information 2, bullet comment information 3, bullet comment information 4, and bullet comment information 5, and the bullet comment format of each piece of bullet comment information is as follows:

Bullet comment information 1: the font type is regular script, the font size is No. 4, and the font color is red.

Bullet comment information 2: the font type is Song style, the font size is No. 6, and the font color is red.

Bullet comment information 3: the font type is regular script, the font size is No. 6, and the font color is green.

Bullet comment information 4: the font type is boldface style, the font size is No. 5, and the font color is black.

Bullet comment information 5: the font type is regular script, the font size is No. 4, and the font color is white.

At this time, the server may classify the bullet comment information 1 and the bullet comment information 5 that both have font size No. 4 into one type, the bullet comment information 2 and the bullet comment information 3 that both have font size No. 6 into one type, and classify the bullet comment information 4 into another type.

Of course, some font sizes may also be classified into one type. For example, font size Nos. 3 and 4 are classified into one type and font size No. 5 and 6 are classified into another type. The classification method may be set according to requirements for an actual application. Details are not further described herein.

(2) The server respectively determines a maximum height of a bullet comment content in each type of the bullet comment information.

For example, the bullet comment information 1, the bullet comment information 2, the bullet comment information 3, the bullet comment information 4, and the bullet comment information 5 are taken as an example. If the bullet comment information 1 and the bullet comment information 5 are classified into a first type, the bullet comment information 2 and the bullet comment information 3 are classified into a second type, and the bullet comment information 4 is classified into a third type, at this time, a maximum height (that is, the height of font size No. 4) of the fonts in the bullet comment information 1 and the bullet comment information 5 is used as a maximum height, for example, 3.5 mm of the bullet comment contents in the first type of bullet comment information; a maximum height (that is, the height of font size No. 6) of the fonts in the bullet comment information 2 and the bullet comment information 3 is used as a maximum height, for example, 1.9 mm, of the bullet comment contents in the second type of bullet comment information, and a maximum height (that is, the height of font size No. 5) of the font in the bullet comment information 4 is used as a maximum height, for example, 2.7 mm, of the bullet comment content in the third type of bullet comment information. The rest can be done in the same manner.

(3) The server respectively generates a bullet comment track corresponding to each type of bullet comment information in the bullet comment display region by using the maximum height of the bullet comment content in the each type of bullet comment information as a reference value.

For example, the bullet comment information 1, the bullet comment information 2, the bullet comment information 3, the bullet comment information 4, and the bullet comment information 5 are taken as an example. If, in point (2), it is determined that the maximum height of the bullet comment content in the first type of bullet comment information is 3.5 mm, at this time, a bullet comment track corresponding to this type of bullet comment information is generated in the bullet comment display region by taking 3.5 mm as the reference value. For example, a bullet comment track with a track height being 3.5 mm is generated, a bullet comment track with a track height being 3.6 mm is generated (assuming that the track height is a maximum height of the font plus 0.1 mm), or the like.

For example, if, in point (2), it is determined that the maximum height of the bullet comment content in the second type of bullet comment information is 1.9 mm, at this time, a bullet comment track corresponding to the type of bullet comment information is generated in the bullet comment display region by taking 1.9 mm as the reference value. For example, a bullet comment track with a track height being 1.9 mm is generated, a bullet comment track with a track height being 2 mm is generated (assuming that the track height is a maximum height of the font plus 0.1 mm), or the like.

Since the plurality of bullet comment tracks generated may have different track heights, cavities with different widths may possibly exist between bullet comment tracks, resulting in waste of a screen space. Therefore, to avoid the problem about cavities between bullet comment tracks caused by inconsistent track heights, optionally, when the bullet comment tracks are generated, the server may concentrate the generated bullet comment tracks as far as possible, for example, make them close to a hot spot region in the bullet comment display region as far as possible (in some embodiments, the hot spot region refers to a region having a maximum bullet comment display frequency). That is, optionally, before the step "the step respectively generates a bullet comment track corresponding to each type of bullet comment information in the bullet comment display region by using the maximum height as a reference value", the server may first determine the hot spot region in the bullet comment display region, so that when a bullet comment track needs to be generated, the position of the hot spot region is taken for reference, to determine a position of the bullet comment track that needs to be generated, for example:

The server determines a height of the bullet comment track corresponding to each type of bullet comment information according to the maximum height, and determines a total quantity of the bullet comment tracks that need to be generated; then, respectively determines a position of each bullet comment track that needs to be generated in the bullet comment display region according to the heights of the bullet comment tracks, the total quantity of the bullet comment tracks, and the hot spot region determined, for example, determines an area that needs to be occupied by the bullet comment tracks that need to be generated in the bullet comment display region according to the heights of the bullet comment tracks and the total quantity of the bullet comment tracks determined; obtain, in the bullet comment display region, a region having a size matching the area as a target region by using a center line of the hot spot region as a center line; and divides the target region according to the heights of the bullet comment tracks and the total quantity of the bullet comment tracks determined, to determine a position of the each bullet comment track that needs to be generated in the bullet comment display region, and so on, so that corresponding bullet comment tracks may be generated at the positions determined.

Figure 4:
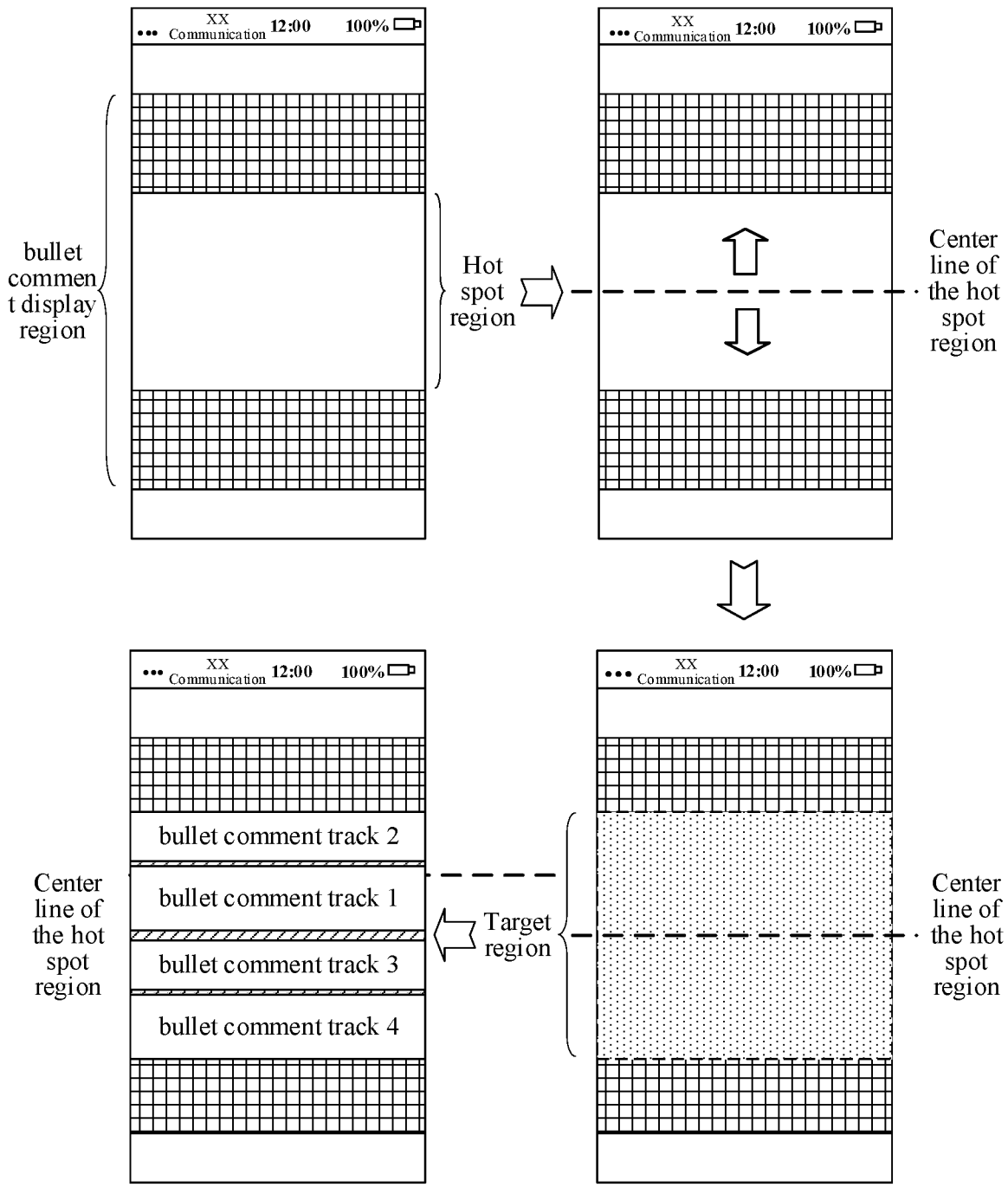
FIG. 4 is an exemplary diagram of a bullet comment display region of a bullet comment processing method according to an embodiment of this application.

For example, four bullet comment tracks need to be generated. The heights of the bullet comment tracks 1 and 4 are both 3.5 mm, the heights of the bullet comment tracks 2 and 3 are both 1.9 mm, and a gap between each bullet comment track may be set according to an actual application. For example, assuming that the value of the gap is 1 mm, the area that needs to be occupied by the bullet comment track that needs to be generated in the bullet comment display region may be determined according to the quantity of the bullet comment tracks that need to be generated, the height of each bullet comment track, and the gap between each bullet comment track. For example, the area may be:

(3.5*2+1.9*2+1*5)*the width of the bullet comment display region=15.8 mm*the width of the bullet comment display region After the area is determined, a region having a size matching the area is obtained in the bullet comment display region as a target region by using a center line of the hot spot region as a center line. For example, referring to FIG. 4, a shadow portion in a picture at the lower right corner of FIG. 4 is the target region. After the target region is determined, the target region may be divided according to the heights of the bullet comment tracks and the total quantity of the bullet comment tracks determined, to determine a position of each bullet comment track that needs to be generated in the bullet comment display region. For example, the center line may be used as a boundary, the bullet comment tracks 1 and 2 are generated in the upper portion and the bullet comment tracks 3 and 4 are generated in the lower portion. Furthermore, the bullet comment tracks 1 and 2 are, as far as possible, generated downward to be close to the center line of the hot spot region, the bullet comment tracks 3 and 4 are, as far as possible, generated upward to be close to the center line of the hot spot region, and so on.

Steps 201 and 202 are optional steps.

203: The server determines to-be-released bullet comment information. For example, the server may determine, from the plurality of pieces of bullet comment information received, information that needs to be displayed at present, to obtain the to-be-released bullet comment information, and so on.

To facilitate description, in some embodiments of this application, the bullet comment content included in the to-be-released bullet comment information is referred to as a to-be-released bullet comment content, and the bullet comment format included in the to-be-released bullet comment information is referred to as a to-be-released bullet comment format.

204: The server uses at least one bullet comment track matching the to-be-released bullet comment format as a candidate track.

For example, if it is indicated in the to-be-released bullet comment format that the font type of the bullet comment content is regular script, the font color is red, the font size is No. 4, at this time, a bullet comment track that can accommodate regular script in font size No. 4 may be selected as a candidate track.

For example, referring to FIG. 4, the generated bullet comment tracks include a bullet comment track 1, a bullet comment track 2, a bullet comment track 3, and a bullet comment track 4, the bullet comment tracks 1 and 4 can both accommodate a bullet comment content in font size No. 4, and therefore, the bullet comment tracks 1 and 4 are used as candidate tracks of the to-be-released bullet comment.

Furthermore, for example, if it is indicated in the to-be-released bullet comment format that the font type of the bullet comment is Song style, the font color is black, the font size is No. 6, at this time, a bullet comment track that can accommodate Song style in font size No. 6 may be selected as a candidate track.

For example, the generated bullet comment tracks include a bullet comment track 1, a bullet comment track 2, a bullet comment track 3, and a bullet comment track 4, the bullet comment tracks 2 and 3 can both accommodate a bullet comment content in font size No. 6, and therefore, the bullet comment tracks 2 and 3 are used as candidate tracks of the to-be-released bullet comment. The rest can be done in the same manner.

205: The server determines a display duration of a bullet comment content that is being displayed in each candidate track, to obtain a first duration corresponding to the each candidate track. For example:

(1) The server determines a length of the bullet comment content that is being displayed in the each candidate track, a moving velocity of the bullet comment content, and a width of a bullet comment display region.

The length of the bullet comment content may be determined according to a quality of pieces of information such as text and/or characters in the bullet comment content and a font size. The moving velocity may be determined according to a bullet comment format or a track attribute. For example, if the moving velocity has been indicated in the bullet comment format, the indicated moving velocity is based on, if the moving velocity is not indicated in the bullet comment format, the moving velocity indicated in the track attribute is based on, and so on.

(2) The server determines, according to the length of the bullet comment content that is being displayed, the moving velocity of the bullet comment content, and the width of the bullet comment display region, a duration of the bullet comment content that is being displayed in the each candidate track being moved out of the bullet comment display region, to obtain the first duration corresponding to the each candidate track.

For example, the server may determine a sum of the length of the bullet comment content that is being displayed and the width of the bullet comment display region, to obtain a first value corresponding to the each candidate track; and determine a quotient of the first value corresponding to the each candidate track and the moving velocity of the bullet comment content that is being displayed in the each candidate track, to obtain the first duration corresponding to the each candidate track. The formula is as follows:

$$t_1 = (w_1 + W)/v_1.$$

$t_1$ represents a first duration, $w_1$ represents a length of a bullet comment content that is being displayed in a candidate track, W represents a width of a bullet comment display region, and $v_1$ represents a moving velocity of a bullet comment content that is being displayed in a candidate track.

For example, the candidate tracks are the bullet comment tracks 1 and 4. If the length $w_1$ of the bullet comment content that is being displayed in the bullet comment track 1 is 17.5 mm, the width W of the bullet comment display region is 50 mm, and the moving velocity $v_1$ of the bullet comment content that is being displayed in the candidate track is 10 mm per second, it can be determined that the first duration $t_1$ corresponding to the bullet comment track 1 is $t_1 = (w_1 + W)/v_1 = (17.5 + 50)/10 = 6.75$ seconds.

Similarly, if the length $w_1$ of the bullet comment content that is being displayed in the bullet comment track 4 is 35 mm, the width W of the bullet comment display region is 50 mm, and the moving velocity $v_1$ of the bullet comment content that is being displayed in the candidate track is 10 mm per second, it can be determined that the first duration $t_1$ corresponding to the bullet comment track 4 is $t_1 = (w_1 + W)/v_1 = (35 + 50)/10 = 8.5$ seconds.

206: The server estimates a display duration of the to-be-released bullet comment content being located in the each candidate track, to obtain a second duration corresponding to the each candidate track.

(1) The server determines a length of the to-be-released bullet comment content, a width of a bullet comment display region, and a moving velocity of the to-be-released bullet comment content when the to-be-released bullet comment content is located in the each candidate track.

The length of the to-be-released bullet comment content may be determined according to a quality of pieces of information such as text and/or characters in the to-be-released bullet comment content and a font size. The moving velocity may be determined according to a to-be-released bullet comment format or a track attribute. For example, if the moving velocity has been indicated in the to-be-released bullet comment format, the indicated moving velocity is based on, if the moving velocity is not indicated in the to-be-released bullet comment format, the moving velocity indicated in the track attribute is based on, and so on.

(2) The server estimates, according to the length of the to-be-released bullet comment content, the width of the bullet comment display region, and the moving velocity of the to-be-released bullet comment content when the to-be-released bullet comment content is located in the each candidate track, a duration of moving the to-be-released bullet comment content out of the bullet comment display region when the to-be-released bullet comment content is located in the each candidate track, to obtain the second duration corresponding to the each candidate track.

For example, the server may determine a sum of the length of the to-be-released bullet comment content and the width of the bullet comment display region, to obtain a second value corresponding to the each candidate track; and determine a quotient of the second value corresponding to the each candidate track and the moving velocity of the to-be-released bullet comment content when the to-be-released bullet comment content is located in the each candidate track, to obtain the second duration corresponding to the each candidate track. The formula is as follows:

$$t_2=(w_2+W)/v_2.$$

$t_2$ represents a second duration, $w_2$ represents a length of a to-be-released bullet comment content, W represents a width of a bullet comment display region, and $v_2$ represents a moving velocity of the to-be-released bullet comment content.

For example, if the length w2 of the to-be-released bullet comment content is 30 mm, the width W of the bullet comment display region is 50 mm, and the moving velocities of the to-be-released bullet comment content in the candidate tracks, that is, the bullet comment tracks 1 and 4, are both 10 mm per second, it can be determined that the second durations $t_2$ of the to-be-released bullet comment content is in the candidate tracks 1 and 4 are both $t_2=(w_2+W)/v_2=(30+50)/10=8$ seconds.

It should be noted that, steps 205 and 206 may be performed not in a sequence.

207: The server compares the second duration and the first duration of the each candidate track, uses the candidate track of which the second duration is greater than the first duration as a target track, and displays the to-be-released bullet comment content in the target track.

For example, $t_1$ represents the first duration and $t_2$ represents the second duration, $t_2$ and $t_1$ of each track are compared, the candidate track matching a condition $t_2 \geq t_1$ is taken as a target track, and the to-be-released bullet comment content is displayed in the target track.

For example, if, in step 206, it is determined that the first duration corresponding to the bullet comment track 1 is 6.75 seconds and the first duration corresponding to the bullet comment track 4 is 8.5 seconds, and in step 207, it is determined that the second durations corresponding to the bullet comment tracks 1 and 4 are both 8 seconds, the bullet comment track of which the second duration is greater than the first duration is used as a target track, that is, the bullet comment track 1 is used as the target track, and the to-be-released bullet comment content is displayed in the target track.

In view of the above, in some embodiments, when a bullet comment needs to be released, at least one bullet comment track matching a to-be-released bullet comment format is used as a candidate track. Then, a display duration (that is, a first duration) of a bullet comment content that is being displayed in each candidate track is determined, and a display duration (that is, a second duration) of a to-be-released bullet comment content being located in each candidate track is estimated, and a target track is selected from the candidate tracks by comparing the two display durations, to display the to-be-released bullet comment. In this solution, since the candidate track of which the second duration is greater than the first duration may be selected as the target track, when the to-be-released bullet comment is moved (or displayed) in the target track, it definitely cannot catch up with a previous bullet comment that is displayed in the target track, to avoid occurrence of bullet comment superposition. Furthermore, since in this solution, a suitable target track may be selected for the bullet comment for displaying only by estimating the display duration of the bullet comment, without calculating a track of the bullet comment in real time and regularly refreshing the position of the bullet comment, consumption of computing resources may be reduced significantly, to reduce impact on rendering of a video content and improve video playing effects.

Furthermore, since, due to an algorithm for composing a bullet comment used in this solution, the generated bullet comment tracks are drawn close to the hot spot region, the problem of cavities with different widths between the bullet comment tracks caused by inconsistent track heights may be avoided, to reduce waste of a screen space and enhance a utilization rate of the screen space.

To implement the foregoing method better, some embodiments of this application further provides a bullet comment processing apparatus. The bullet comment processing apparatus may be integrated in a device such as a server.

Figure 5:
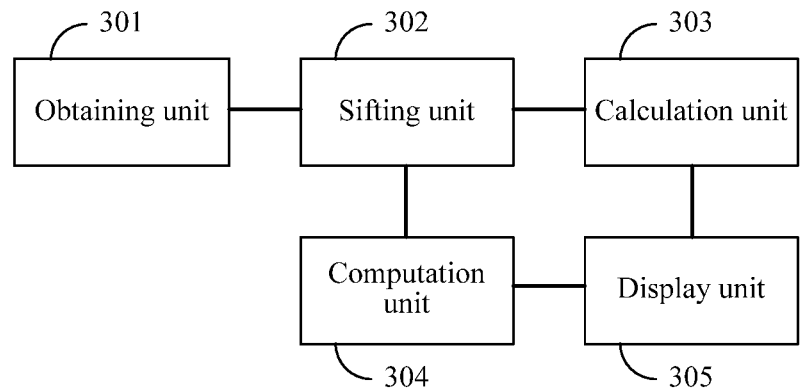
FIG. 5 is a schematic structural diagram of a bullet comment processing apparatus according to an embodiment of this application.

For example, as shown in FIG. 5, the bullet comment processing apparatus may include an obtaining unit 301, a sifting unit 302, a calculation unit 303, a computation unit 304, and a display unit 305.

(1) The obtaining unit 301.

The obtaining unit 301 is configured to obtain to-be-released bullet comment information.

(2) The sifting unit 302.

The sifting unit 302 is configured to use at least one bullet comment track matching the to-be-released bullet comment format as a candidate track.

(3) The computation unit 303.

The calculation unit 303 is configured to determine a display duration of a bullet comment content that is being displayed in each candidate track, to obtain a first duration corresponding to the each candidate track.

For example, the calculation unit 303 may be configured to determine a length of the bullet comment content that is being displayed in the each candidate track, a moving velocity of the bullet comment content, and a width of a bullet comment display region; determine, according to the length of the bullet comment content that is being displayed, the moving velocity of the bullet comment content, and the width of a bullet comment display region, a duration of the bullet comment content that is being displayed in the each candidate track being moved out of the bullet comment display region, to obtain the first duration corresponding to the each candidate track.

(4) The computation unit 304.

The computation unit 304 is configured to determine a display duration of the to-be-released bullet comment content being located in the each candidate track, to obtain a second duration corresponding to the each candidate track.

For example, the computation unit 304 may be configured to determine a length of the to-be-released bullet comment content, a width of a bullet comment display region, and a moving velocity of the to-be-released bullet comment content when the to-be-released bullet comment content is located in the each candidate track; and determine, according to the length of the to-be-released bullet comment content, the width of the bullet comment display region, and the moving velocity of the to-be-released bullet comment content when the to-be-released bullet comment content is located in the each candidate track, a duration of moving the to-be-released bullet comment content out of the bullet comment display region when the to-be-released bullet comment content is located in the each candidate track, to obtain the second duration corresponding to the each candidate track.

For example, the computation unit 304 may be configured to determine a moving velocity of the to-be-released bullet comment content when the to-be-released bullet comment content is located in the each candidate track and the width of the bullet comment display region; and determine a quotient of the width of the bullet comment display region and the moving velocity of the to-be-released bullet comment content when the to-be-released bullet comment content is located in each the candidate track, to obtain the second duration corresponding to each the candidate track.

(5) The display unit 305.

The display unit 305 is configured to compare the second duration and the first duration of the each candidate track, use the candidate track of which the second duration is greater than the first duration as a target track, and display the to-be-released bullet comment content in the target track.

Figure 6:
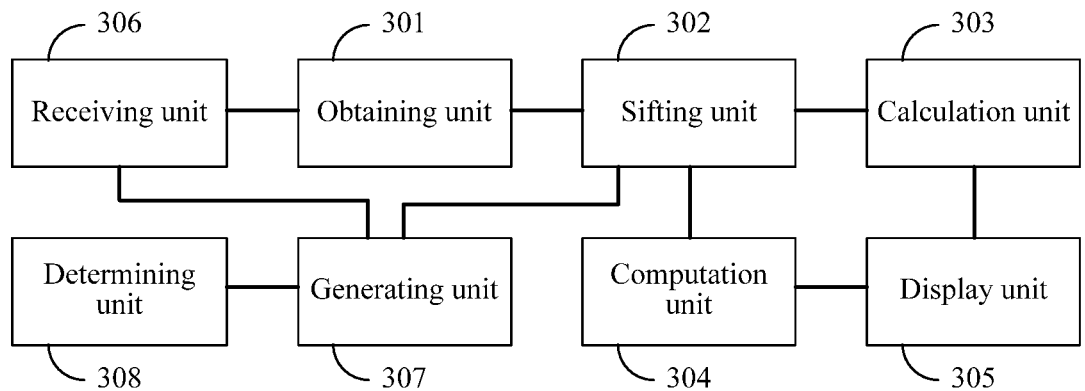
FIG. 6 is another schematic structural diagram of a bullet comment processing apparatus according to an embodiment of this application.

The bullet comment tracks may be generated according to the received bullet comment information, that is, as shown in FIG. 6, the bullet comment processing apparatus may further include a receiving unit 306 and a generating unit 307.

The receiving unit 306 is configured to receive a plurality of pieces of bullet comment information, the bullet comment information including a bullet comment content and a bullet comment format.

The generating unit 307 is configured to generate a plurality of bullet comment tracks according to the plurality of pieces of bullet comment information.

At this time, the sifting unit 301 is configured to determine, from the plurality of pieces of bullet comment information received from the receiving unit 306, the bullet comment information that needs to be displayed at present, to obtain the to-be-released bullet comment information.

The sifting unit 302 may be configured to obtain, from the plurality of bullet comment tracks generated by the generating unit 307, at least one bullet comment track matching the to-be-released bullet comment format, to obtain the candidate track.

The bullet comment tracks may be generated in various manners. For example, the generating unit may be configured to classify the plurality of pieces of bullet comment information according to bullet comment formats of the plurality of pieces of bullet comment information received, respectively determine a maximum height of a bullet comment content in each type of the bullet comment information, and respectively generate the bullet comment track corresponding to each type of the bullet comment information in the bullet comment display region by using the maximum height as a reference value. The foregoing method embodiment may be referred to for details. Details are not further described herein.

Since the plurality of bullet comment tracks generated may have different track heights, cavities may possibly exist between bullet comment tracks, resulting in waste of a screen space. Therefore, to avoid the problem about cavities between bullet comment tracks caused by inconsistent track heights, optionally, when the bullet comment tracks are generated, the generated bullet comment tracks are concentrated as far as possible, for example, are close to a hot spot region in the bullet comment display region as far as possible. That is, optionally, as shown in FIG. 6, the bullet comment processing apparatus may further include a determining unit 308.

The determining unit 308 may be configured to determine a hot spot region in the bullet comment display region, the hot spot region is a region in which a bullet comment display frequency is greater than a preset threshold, and the preset threshold may be set according to requirements for an actual application. A quantity of the hot spot regions may be one or more than one. To facilitate description, in some embodiments of this application, an example that the quantity of the hot spot regions is one is taken for description, that is, in some embodiments of this application, an example that the hot spot region is a region having a highest display frequency is taken for description.

At this time, the generating unit 307 may be further configured to determine a height of the bullet comment track corresponding to each type of the bullet comment information according to the maximum height, determine a total quantity of the bullet comment tracks that need to be generated, respectively determine a position of each bullet comment track that needs to be generated in the bullet comment display region according to the heights of the bullet comment tracks, the total quantity of the bullet comment tracks, and the hot spot region determined, and respectively generate the corresponding bullet comment tracks at the positions determined.

For example, the generating unit 307 may be configured to determine an area that needs to be occupied by the bullet comment track that needs to be generated in the bullet comment display region according to the heights of the bullet comment tracks and the total quantity of the bullet comment tracks determined; obtain, in the bullet comment display region, a region having a size matching the area as a target region by using a center line of the hot spot region as a center line; and divide the target region according to the heights of the bullet comment tracks and the total quantity of the bullet comment tracks determined, to determine a position of the each bullet comment track that needs to be generated in the bullet comment display region.

During implementation, the foregoing units may be implemented as independent entities, or may be combined arbitrarily, or may be implemented as the same entity or several entities. For implementation of the foregoing units, refer to the foregoing method embodiments. Details are not described herein again.

In view of the above, in some embodiments, when a bullet comment needs to be released, at least one bullet comment track matching a to-be-released bullet comment format is obtained by the sifting unit 302 as a candidate track. Then, a display duration (that is, a first duration) of a bullet comment content that is being displayed in each candidate track is determined by the calculation unit 303, and a display duration (that is, a second duration) of a to-be-released bullet comment content being located in each candidate track is determined by the computation unit 304, and a target track is selected from the candidate tracks by the display unit 305 by comparing the two display durations, to display the to-be-released bullet comment. In this solution, since the candidate track of which the second duration is greater than the first duration may be selected as the target track, when the to-be-released bullet comment is moved (or displayed) in the target track, it definitely cannot catch up with a previous bullet comment that is displayed in the target track, to avoid occurrence of bullet comment superposition. Furthermore, since in this solution, a suitable target track may be selected for the bullet comment for displaying only by calculating the display duration of the bullet comment, without calculating a track of the bullet comment in real time and regularly refreshing the position of the bullet comment, consumption of computing resources may be reduced significantly, to reduce impact on rendering of a video content and improve video playing effects.

Figure 7:
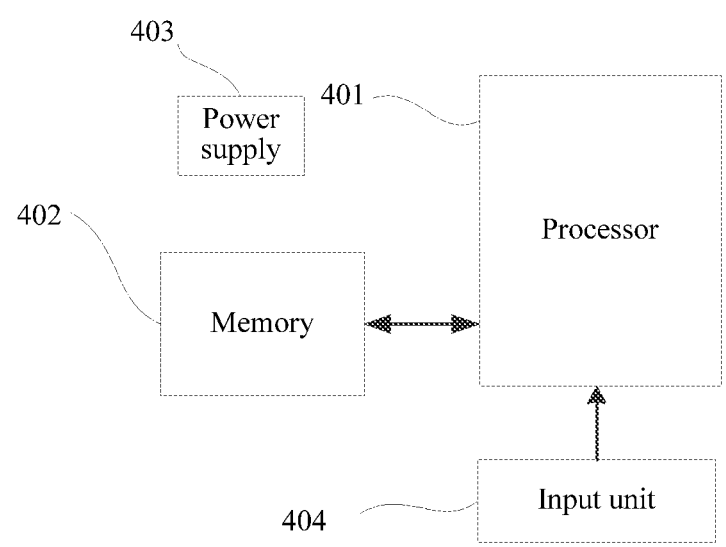
FIG. 7 is a schematic structural diagram of a server according to an embodiment of this application.

An embodiment of this application further provides a server. FIG. 7 is a schematic structural diagram of a server according to an embodiment of this application.

The server may include members such as a processor 401 including one or more processing cores, a memory 402 including one or more computer readable storage mediums, a power supply 403, and an input unit 404. A person skilled in the art may understand that the server structure shown in FIG. 7 does not constitute a limit to the server. The server may include more or fewer parts than those shown in the figure, may combine some parts, or may have different part arrangements. Where:

The processor 401 is a control center of the server, and is connected to various parts of the entire server by using various interfaces and lines. By running or executing a software program and/or module stored in the memory 402, and invoking data stored in the memory 402, the processor 701 executes various functions of the server and performs data processing, thereby monitoring the entire server. Optionally, the processor 401 may include one or more processing cores. Optionally, the processor 401 may integrate an application processor and a modem processor. The application processor mainly processes an operating system, a user interface, an application program, and the like. The modem processor mainly processes wireless communication. It may be understood that the foregoing modem processor may alternatively not be integrated into the processor 401.

The memory 402 may be configured to store a software program and module. The processor 401 executes the software program and module stored in the memory 402, to implement various functional applications and data processing. The memory 402 may mainly include a program storage region and a data storage region. The program storage region may store an operating system, an application program required by at least one function (such as a sound playing function and an image display function), and the like. The data storage region may store data created according to use of the server, and the like. In addition, the memory 402 may include a high-speed random access memory, and may further include a non-volatile memory such as at least one magnetic disk storage device, a flash memory device, or another volatile solid storage device. Correspondingly, the memory 402 may further include a memory controller, to provide access of the processor 401 to the memory 402.

The server further includes the power supply 403 for supplying power to the components. Optionally, the power supply 403 may be logically connected to the processor 401 by using a power management system, thereby implementing functions such as charging, discharging, and power consumption management by using the power management system. The power supply 403 may further include one or more direct current power supplies or alternating current power supplies, a re-charging system, a power failure detection circuit, a power supply converter or inverter, a power supply state indicator, and any other component.

The server may include the input unit 404 configured to receive input digit or character information, and generate a keyboard, mouse, joystick, optical, or track ball signal input related to the user setting and function control.

Although not shown in the figure, the server may further include a display unit. Details are not further described herein. In some embodiments, the processor 401 in the server may load an executable file corresponding to the procedures of one or more application programs into the memory 402 according to the following instruction, the processor 401 executes the application stored in the memory 402, to implement various functions, that is, the server includes the processor 401 and the memory 402, the memory 402 stores at least one instruction, and the at least one instruction is loaded and executed by the processor 401 to implement the following steps:

Obtain to-be-released bullet comment information, the to-be-released bullet comment information including a to-be-released bullet comment content and a to-be-released bullet comment format; use at least one bullet comment track matching the to-be-released bullet comment format as a candidate track; determine a display duration of a bullet comment content that is being displayed in each candidate track, to obtain a first duration corresponding to the each candidate track; determine a display duration of the to-be-released bullet comment content being located in the each candidate track, to obtain a second duration corresponding to the each candidate track; and compare the second duration and the first duration of the each candidate track, use the candidate track of which the second duration is greater than the first duration as a target track, and display the to-be-released bullet comment content in the target track.

Optionally, when the at least one instruction is loaded and executed by the processor 401, the at least one instruction is further used to implement the following steps: determining a length of the bullet comment content that is being displayed in the each candidate track, a moving velocity of the bullet comment content, and a width of a bullet comment display region; determining, according to the length of the bullet comment content that is being displayed, the moving velocity of the bullet comment content, and the width of the bullet comment display region, a duration of the bullet comment content that is being displayed in the each candidate track being moved out of the bullet comment display region, to obtain the first duration corresponding to the each candidate track.

Optionally, when the at least one instruction is loaded and executed by the processor 401, the at least one instruction is further used to implement the following steps: determining a length of the to-be-released bullet comment content, a width of a bullet comment display region, and a moving velocity of the to-be-released bullet comment content when the to-be-released bullet comment content is located in the each candidate track; and determining, according to the length of the to-be-released bullet comment content, the width of the bullet comment display region, and the moving velocity of the to-be-released bullet comment content when the to-be-released bullet comment content is located in the each candidate track, a duration of moving the to-be-released bullet comment content out of the bullet comment display region when the to-be-released bullet comment content is located in the each candidate track, to obtain the second duration corresponding to the each candidate track.

The bullet comment track may be generated according to the received bullet comment information, that is, when the at least one instruction is loaded and executed by the processor 401, the at least one instruction is further used to implement the following steps:

Receive a plurality of pieces of bullet comment information and generate a plurality of bullet comment tracks according to the plurality of pieces of bullet comment information.

The bullet comment tracks may be generated in various manners. The foregoing method embodiments may be referred to. Details are not further described herein.

It should be noted that, when the at least one instruction is loaded and executed by the processor 401, the at least one instruction is further used to implement the bullet comment processing method provided in each of the foregoing method embodiments.

The previous embodiments may be referred to for the implementation of each of the foregoing operations. Details are not further described herein.

In view of the above, in some embodiments, when the server needs to release a bullet comment, at least one bullet comment track matching a to-be-released bullet comment format is used as a candidate track. Then, a display duration (that is, a first duration) of a bullet comment content that is being displayed in each candidate track is determined, and a display duration (that is, a second duration) of a to-be-released bullet comment content being located in each candidate track is determined, and a target track is selected from the candidate tracks by comparing the two display durations, to display the to-be-released bullet comment. In this solution, since the candidate track of which the second duration is greater than the first duration may be selected as the target track, when the to-be-released bullet comment is moved (or displayed) in the target track, it definitely cannot catch up with a previous bullet comment that is displayed in the target track, to avoid occurrence of bullet comment superposition. Furthermore, since in this solution, a suitable target track may be selected for the bullet comment for displaying only by calculating the display duration of the bullet comment, without calculating a track of the bullet comment in real time and regularly refreshing the position of the bullet comment, consumption of computing resources may be reduced significantly, to reduce impact on rendering of a video content and improve video playing effects.

A person of ordinary skill in the art could understand that, all or some steps of various embodiments in the embodiments may be implemented through instructions, or implemented through instructions controlling relevant hardware, and the instructions may be stored in a computer readable storage medium and loaded and executed by a processor.

Accordingly, an embodiment of this application provides a storage medium, storing a plurality of instructions, the instructions being suitable to be loaded by the processor, to perform the steps in any bullet comment processing method according to the embodiments of this application. For example, the instructions may perform the following steps:

Obtain to-be-released bullet comment information, the to-be-released bullet comment information including a to-be-released bullet comment content and a to-be-released bullet comment format; use at least one bullet comment track matching the to-be-released bullet comment format as a candidate track; determine a display duration of a bullet comment content that is being displayed in each candidate track, to obtain a first duration corresponding to the each candidate track; determine a display duration of the to-be-released bullet comment content being located in the each candidate track, to obtain a second duration corresponding to the each candidate track; and compare the second duration and the first duration of the each candidate track, use the candidate track of which the second duration is greater than the first duration as a target track, and display the to-be-released bullet comment content in the target track.

For example, determine a length and a moving velocity of the bullet comment content that is being displayed in each candidate track and a width of a bullet comment display region; determine a duration of the bullet comment content that is being displayed in the each candidate track being moved out of the bullet comment display region according to the length and the moving velocity of the bullet comment content that is being displayed and the width of the bullet comment display region, to obtain a first duration corresponding to the each candidate track; determine a length of the to-be-released bullet comment content, the width of the bullet comment display region, and a moving velocity of the to-be-released bullet comment content when the to-be-released bullet comment content is located in the each candidate track; and determine, according to the length of the to-be-released bullet comment content, the width of the bullet comment display region, and the moving velocity of the to-be-released bullet comment content when the to-be-released bullet comment content is located in the each candidate track, a duration of moving the to-be-released bullet comment content out of the bullet comment display region when the to-be-released bullet comment content is located in the each candidate track, to obtain the second duration corresponding to the each candidate track.

The previous embodiments may be referred to for the implementation of each of the foregoing operations. Details are not further described herein.

The storage medium may include: a read-only memory (ROM), a random access memory (RAM), a magnetic disk, an optical disc, or the like.

Since the instructions stored in the storage medium may perform the steps of any bullet comment processing method in the embodiments of this application, the instructions can implement advantageous effects that may be implemented by any bullet comment processing method in the embodiments of this application. The foregoing embodiments may be referred to for details. Details are not further described herein.

The bullet comment processing method, the bullet comment processing apparatus, the server, and the storage medium provided in the embodiments of this application are described above in detail. Although the principles and implementations of the embodiments of this application are described by using specific examples in the specification, the foregoing descriptions of the embodiments are only intended to help understand the method and core idea of the embodiments of this application. Meanwhile, a person skilled in the art may make modifications to the specific implementations and application range according to the idea of the embodiments of this application. In conclusion, the content of the specification should not be construed as a limitation to this application.

What is claimed is:

1. A bullet comment processing method, comprising:
  obtaining, by a server, to-be-released bullet comment information, the to-be-released bullet comment information including a to-be-released bullet comment content and a to-be-released bullet comment format;
  identifying, by the server, a candidate track accommodating the to-be-released bullet comment format;
  determining, by the server, a display duration of an existing bullet comment content in the candidate track as a first duration corresponding to the candidate track, wherein the first duration is determined by:

determining, by the server, a length of the existing bullet comment content in the candidate track, a moving velocity of the existing bullet comment content, and a width of a bullet comment display region; and determining, by the server, according to the length of the existing bullet comment content in the candidate track, the moving velocity of the existing bullet comment content, and the width of the bullet comment display region, a duration of the existing bullet comment content being moved out of the bullet comment display region as the first duration corresponding to the candidate track;

determining, by the server, a display duration of the to-be-released bullet comment content when being placed in the candidate track as a second duration corresponding to the candidate track;

comparing, by the server, the second duration and the first duration of the candidate track;

identifying, by the server, the candidate track as a target track for displaying the to-be-released bullet comment content in response to determining the second duration of the target track is greater than the first duration of the target track; and displaying, by the server, the to-be-released bullet comment content at the target track.

2. The method according to claim 1, wherein determining the duration of the existing bullet comment content in the candidate track being moved out of the bullet comment display region comprises:

determining, by the server, a sum of the length of the existing bullet comment content in the candidate track and the width of the bullet comment display region as a first value corresponding to the candidate track; and determining, by the server, a quotient of the first value corresponding to the candidate track and the moving velocity of the existing bullet comment content in the candidate track as the first duration corresponding to the candidate track.

3. The method according to claim 1, wherein determining the display duration of the to-be-released bullet comment content when being placed in the candidate track as the second duration corresponding to the candidate track comprises:

determining, by the server, a length of the to-be-released bullet comment content, a width of a bullet comment display region, and a moving velocity of the to-be-released bullet comment content when the to-be-released bullet comment content is placed in the candidate track; and determining, by the server, according to the length of the to-be-released bullet comment content, the width of the bullet comment display region, and the moving velocity of the to-be-released bullet comment content when the to-be-released bullet comment content is placed in the candidate track, a duration of moving the to-be-released bullet comment content out of the bullet comment display region as the second duration corresponding to the candidate track.

4. The method according to claim 3, wherein determining the duration of moving the to-be-released bullet comment content out of the bullet comment display region comprises:

determining, by the server, a sum of the length of the to-be-released bullet comment content and the width of the bullet comment display region as a second value corresponding to the candidate track; and determining, by the server, a quotient of the second value corresponding to the candidate track and the moving velocity of the to-be-released bullet comment content as the second duration corresponding to the candidate track.

5. The method according to claim 1, wherein determining, by the server, the display duration of the to-be-released bullet comment content when being placed in the candidate track as the second duration corresponding to the candidate track comprises:

determining, by the server, a moving velocity of the to-be-released bullet comment content when the to-be-released bullet comment content is placed in the candidate track and a width of a bullet comment display region; and determining, by the server, a quotient of the width of the bullet comment display region and the moving velocity of the to-be-released bullet comment content as the second duration corresponding to the candidate track.

6. The method according to claim 1, further comprising:

receiving, by the server, a plurality of pieces of bullet comment information, each piece of bullet comment information comprising including a bullet comment content and a bullet comment format; and generating, by the server, a plurality of bullet comment tracks according to the plurality of pieces of bullet comment information wherein, obtaining the to-be-released bullet comment information comprises:

determining, by the server, from the plurality of pieces of bullet comment information, a piece of bullet comment information that needs to be displayed at present as the to-be-released bullet comment information.

7. The method according to claim 6, wherein generating, by the server, the plurality of bullet comment tracks according to the plurality of pieces of bullet comment information comprises:

classifying, by the server, each of the plurality of pieces of bullet comment information into a corresponding type, according to bullet comment formats of the plurality of pieces of bullet comment information;

determining, by the server, a maximum height of the corresponding type of each of the plurality of pieces of bullet comment information; and respectively generating, by the server, a bullet comment track in the bullet comment display region by using the maximum height as a reference value.

8. The method according to claim 7, further comprising:

determining, by the server, a hot spot region in the bullet comment display region, the hot spot region being a region having a maximum bullet comment display frequency wherein, respectively generating, by the server, the bullet comment track comprises:

determining, by the server, heights of the bullet comment tracks, each height being determined according to the maximum content height of the corresponding type of the each of plurality of pieces of bullet comment information;

determining a total quantity of the bullet comment tracks that need to be generated;

respectively determining, by the server, a position of each bullet comment track that needs to be generated in the bullet comment display region according to the heights of the bullet comment tracks, the total quantity of the bullet comment tracks, and the hot spot region; and respectively generating, by the server, each bullet comment track at the determined corresponding position.

9. The method according to claim 8, wherein respectively determining, by the server, the position of each bullet comment track that needs to be generated in the bullet comment display region according to the heights of the bullet comment tracks, the total quantity of the bullet comment tracks, and the hot spot region determined comprises:
- determining, by the server, an area that needs to be occupied by the bullet comment tracks that need to be generated in the bullet comment display region according to the heights of the bullet comment tracks and the total quantity of the bullet comment tracks determined;
- obtaining, by the server, in the bullet comment display region, a region having a size matching the area as a target region by using a center line of the hot spot region as a center line of the target region; and
- sectioning, by the server, the target region, according to the heights of the bullet comment tracks and the total quantity of the bullet comment tracks, to determine the position of the each bullet comment track that needs to be generated in the bullet comment display region.

10. The method according to claim 1, wherein the to-be-released bullet comment format includes one or more of a font type, a font size, and a font color.

11. A bullet comment processing apparatus, applied to a server, comprising: a memory; and a processor coupled to the memory and configured to:
- obtain to-be-released bullet comment information, the to-be-released bullet comment information including a to-be-released bullet comment content and a to-be-released bullet comment format;
- identify a candidate track accommodating the to-be-released bullet comment format;
- determine a display duration of an existing bullet comment content in the candidate track as a first duration corresponding to the candidate track, wherein the first duration is determined by:
  - determining, by the server, a length of the existing bullet comment content in the candidate track, a moving velocity of the existing bullet comment content, and a width of a bullet comment display region; and
  - determining, by the server, according to the length of the existing bullet comment content in the candidate track, the moving velocity of the existing bullet comment content, and the width of the bullet comment display region, a duration of the existing bullet comment content being moved out of the bullet comment display region as the first duration corresponding to the candidate track;
- determine a display duration of the to-be-released bullet comment content when being placed in the candidate track as a second duration corresponding to the candidate track;
- compare the second duration and the first duration of the candidate track;
- identify, the candidate track as a target track for displaying the to-be-released bullet comment content in response to determining the second duration of the target track is greater than the first duration of the target track; and
- displaying the to-be-released bullet comment content at the target track.

12. The apparatus according to claim 11, wherein the processor is further configured to:
- determine a sum of the length of the existing bullet comment content in the candidate track and the width of the bullet comment display region as a first value corresponding to the candidate track; and
- determine a quotient of the first value corresponding to the candidate track and the moving velocity of the existing bullet comment content in the candidate track as the first duration corresponding to the candidate track.

13. The apparatus according to claim 11, wherein the processor is further configured to:
- determine a length of the to-be-released bullet comment content, a width of a bullet comment display region, and a moving velocity of the to-be-released bullet comment content when the to-be-released bullet comment content is placed in the candidate track; and
- determine, according to the length of the to-be-released bullet comment content, the width of the bullet comment display region, and the moving velocity of the to-be-released bullet comment content when the to-be-released bullet comment content is placed in the candidate track, a duration of moving the to-be-released bullet comment content out of the bullet comment display region as the second duration corresponding to the candidate track.

14. The apparatus according to claim 13, wherein the processor is further configured to:
- determine a sum of the length of the to-be-released bullet comment content and the width of the bullet comment display region as a second value corresponding to the candidate track; and
- determine a quotient of the second value corresponding to the candidate track and the moving velocity of the to-be-released bullet comment content as the second duration corresponding to the candidate track.

15. The apparatus according to claim 11, wherein the processor is further configured to:
- determine a moving velocity of the to-be-released bullet comment content when the to-be-released bullet comment content is placed in the candidate track and a width of a bullet comment display region; and
- determine a quotient of the width of the bullet comment display region and the moving velocity of the to-be-released bullet comment content as the second duration corresponding to the candidate track.

16. The apparatus according to claim 11, wherein the processor is further configured to:
- receive a plurality of pieces of bullet comment information, each piece of bullet comment information including a bullet comment content and a bullet comment format;
- generate a plurality of bullet comment tracks according to the plurality of pieces of bullet comment information; and
- determine, from the plurality of pieces of bullet comment information received, a piece of bullet comment information that needs to be displayed at present as the to-be-released bullet comment information.

17. The apparatus according to claim 16, wherein the processor is further configured to:
- classify each of the plurality of pieces of bullet comment information into a corresponding type, according to bullet comment formats of the plurality of pieces of bullet comment information;
- determine a maximum height of the corresponding type of each of the plurality of pieces of bullet comment information; and respectively generate a bullet comment track in the bullet comment display region, by using the maximum height as a reference value.

18. The apparatus according to claim 17, wherein the processor is further configured to:
   determine a hot spot region in the bullet comment display region, the hot spot region is a region having a maximum bullet comment display frequency; and
   determine heights of the bullet comment tracks, each height being determined according to the maximum content height of the corresponding type of the each of plurality of pieces of bullet comment information;
   determine a total quantity of the bullet comment tracks that need to be generated;
   respectively determine a position of each bullet comment track that needs to be generated in the bullet comment display region according to the heights of the bullet comment tracks, the total quantity of the bullet comment tracks, and the hot spot region determined; and
   respectively generate the corresponding bullet comment track at the determined corresponding position.

19. A non-transitory computer readable storage medium, storing a plurality of instructions, the instructions, when being executed by a processor, causing the processor to perform:
   obtaining to-be-released bullet comment information, the to-be-released bullet comment information including a to-be-released bullet comment content and a to-be-released bullet comment format;
   identifying a candidate track accommodating the to-be-released bullet comment format;
   determining a display duration of an existing bullet comment content in the candidate track as a first duration corresponding to the candidate track, wherein the first duration is determined by:
      determining, by the server, a length of the existing bullet comment content in the candidate track, a moving velocity of the existing bullet comment content, and a width of a bullet comment display region; and
      determining, by the server, according to the length of the existing bullet comment content in the candidate track, the moving velocity of the existing bullet comment content, and the width of the bullet comment display region, a duration of the existing bullet comment content being moved out of the bullet comment display region as the first duration corresponding to the candidate track;
   determining a display duration of the to-be-released bullet comment content when being placed in the candidate track as a second duration corresponding to the candidate track;
   comparing the second duration and the first duration of the candidate track; and
   identifying the candidate track as a target track for displaying the to-be-released bullet comment content in response to determining the second duration of the target track is greater than the first duration of the target track; and
   displaying the to-be-released bullet comment content at the target track.

* * * * *